Nov. 17, 1959

A. D. PINOTTI 2,913,509

GLASS CONDITIONING APPARATUS

Filed Nov. 6, 1956

INVENTOR
Alfred D. Pinotti
BY
ATTORNEYS

United States Patent Office 2,913,509
Patented Nov. 17, 1959

2,913,509
GLASS CONDITIONING APPARATUS

Alfred D. Pinotti, Toledo, Ohio, assignor to Owens-Illinois Glass Company, a corporation of Ohio Application November 6, 1956, Serial No. 620,747

1 Claim. (Cl. 13—6)

This invention is applicable to glass feeder apparatus for feeding molten glass received from a glass furnace, and more specifically to a glass feeder provided with electrode elements for resistance heating the glass to a desired viscosity at the point of discharge.

This invention is adaptable to supplement the glass feeder system shown and described in the co-pending application of the present inventor, for U.S. patent entitled "Method of and Apparatus for Glass Feeding and Conditioning," filed August 28, 1956, Serial No. 606,665.

As is well known in glass feeding practice, it is desirable to control the temperature and viscosity of glass supplied to a forming machine for the production of commercially acceptable ware. To achieve this result, it is necessary to control the rate of cooling of the glass from the point it leaves the forehearth to the point of discharge in the feeder orifice, so that the temperature of the discharged glass will be such that it will flow out the discharge orifice at the proper rate and will be in the proper condition for working.

The relatively high feed temperatures necessary for working and forming borosilicate glass compositions make this control over the rate of cooling especially significant.

In employing electrical energy through electrode elements to control this discharge temperature, the molten glass contained in the feeder spout is utilized as the resistance element in which the electrical energy is transformed into heat absorbed by the glass.

Supplementary to adding heat to the glass in the feed spout this invention utilizes means to stir the glass contained in the feed spout to mix the higher temperature core of glass near the center of the spout with the cooler outer portions to obtain more uniformity in the temperature and consistency throughout the body of glass contained in the spout. The present invention contemplates a glass feeding spout for achieving desired temperature and viscosity conditioning of glass at point of discharge by electric resistance heating.

In addition to supplying heat to the glass contained in the spout by electric resistance heating, the present invention contemplates the necessity for maintaining a uniform temperature and consistency throughout the body of glass.

It is, therefore, an object of the present invention to provide a glass conditioning apparatus for supplying electric resistance heating to glass contained in the apparatus, as well as stirring the glass for controlling temperature and viscosity at point of discharge.

Another object of this invention is to provide the electrode elements respectively, on the element forming the discharge point and on the stirring element.

Another object of this invention is to provide an efficient and economical apparatus for controlling temperature and viscosity of glass fed to a forming machine for the manufacture of glassware.

Other objects will be in part apparent and in part pointed out hereinafter.

*First embodiment*

Figure 1:
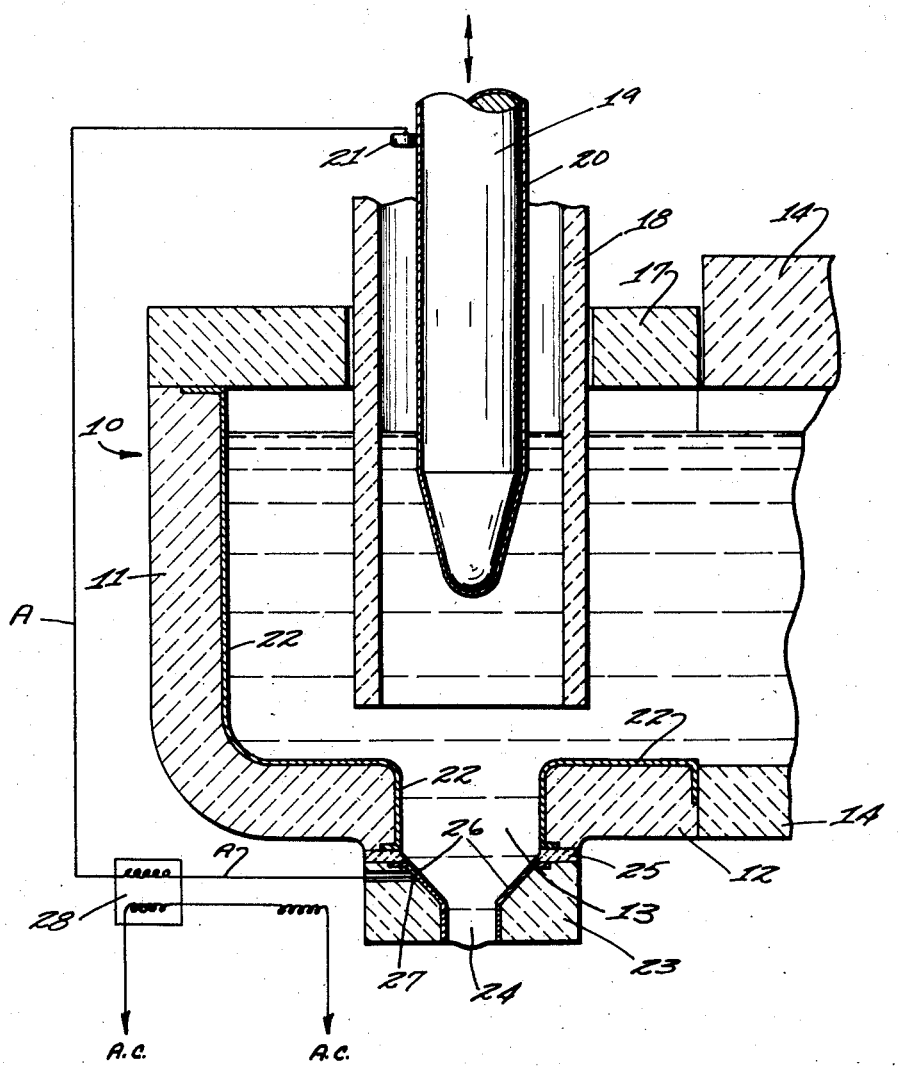
Fig. 1 is a sectional elevational view, showing the first embodiment of the invention.

In Fig. 1, 10 indicates a feeder bowl constructed of an electrical insulator material, such as fire brick or other refractory, and is provided with integral side walls 11 and bottom wall 12. Bottom wall 12 has a centrally located bottom wall opening 13. Feeder bowl 10 is attached to forehearth 14 to receive glass therefrom, as shown and described in aforementioned co-pending application, Serial No. 606,665.

At the top of feeder bowl 10 is a cover plate 17 to complete the enclosure of said bowl and cover 17 is provided to receive a hollow cylindrical sleeve 18 therethrough. Sleeve 18 is supported by conventional means (not shown) for continuously rotating it and holding the lower portion of said sleeve partially submerged in the glass in bowl 10 during feeding.

Needle plunger 19, constructed of refractory, is vertically reciprocated concentrically inside sleeve 18, so that the lower end of said plunger is submerged in glass in bowl 10 at all times. Plunger 19 is actuated by mechanism of the type shown and described in U.S. Patent 1,631,107 to K. E. Peiler, for "Feeding Molten Glass."

As is well known in glass feeding practice, the rotating sleeve 18 and vertically reciprocable plunger 19 constitute a means for mixing the glass in bowl 10 and for controlling the issuance of gob charges through an underlying orifice.

Plunger 19 has an electrode layer 20 of electricity-conducting material, such as a platinum alloy, overlying its exterior surface. The electrode layer 20 is utilized to achieve two main functions, viz., to provide an upper electrode for passage of electric current into the body of glass in bowl 10, and to provide a smooth non-erosive coating on its exterior surface to prevent contamination of the working glass being fed from said bowl.

Along the length of plunger 19 is a sliding electric connection 21 (shown schematically) in engagement with electrode layer 20 on plunger 19 for conducting electric current into the glass from above.

An integral platinum alloy lining 22 is applied to the interior surfaces of side walls 11 and bottom wall 12 and extends through bottom wall opening 13. This lining provides a means of preventing refractory material from contaminating the working glass body contained in bowl 10.

Adjacent the bottom wall 12 of bowl 10 is discharge orifice member 23 provided with a funnel-shaped discharge orifice 24. Discharge orifice member 23 is spaced vertically from bottom wall 12 of the bowl 10 by an electrically non-conductive spacer ring 25. Discharge orifice 24 is aligned to register with bottom wall opening 13 to receive and guide a continuous flow of glass discharged from the feeder bowl 10. Discharge orifice 24 is lined with an electricity-conducting material, such as a platinum alloy, which serves as a lower electrode 26 plus presenting a non-erosive flow surface for working glass at its point of discharge.

An electrical circuit A is connected between the sliding electrical connection 21 to electrode layer 20 on plunger 19, and terminal connection 27 on lower electrode 26 of discharge orifice 24. Electric current is introduced into circuit A through the secondary windings of transformer 28. Transformer 28 is connected to an alternating current power supply. Thus, electric current flowing in circuit A is conducted through the electricity-conducting electrode layer 20 on plunger 19 in contact with the glass body contained in bowl 10, then through the glass toward discharge orifice 24 and to the electricity-conducting coating of lower electrode 26 to complete the circuit. The resistance presented by the glass transforms the electrical energy into heat in the area of discharge orifice 24, and thereby supplies heat to the working glass prior to its discharge to control the temperature and viscosity of the glass just prior to feeding to the forming machinery (not shown).

*Second embodiment*

Figure 2:
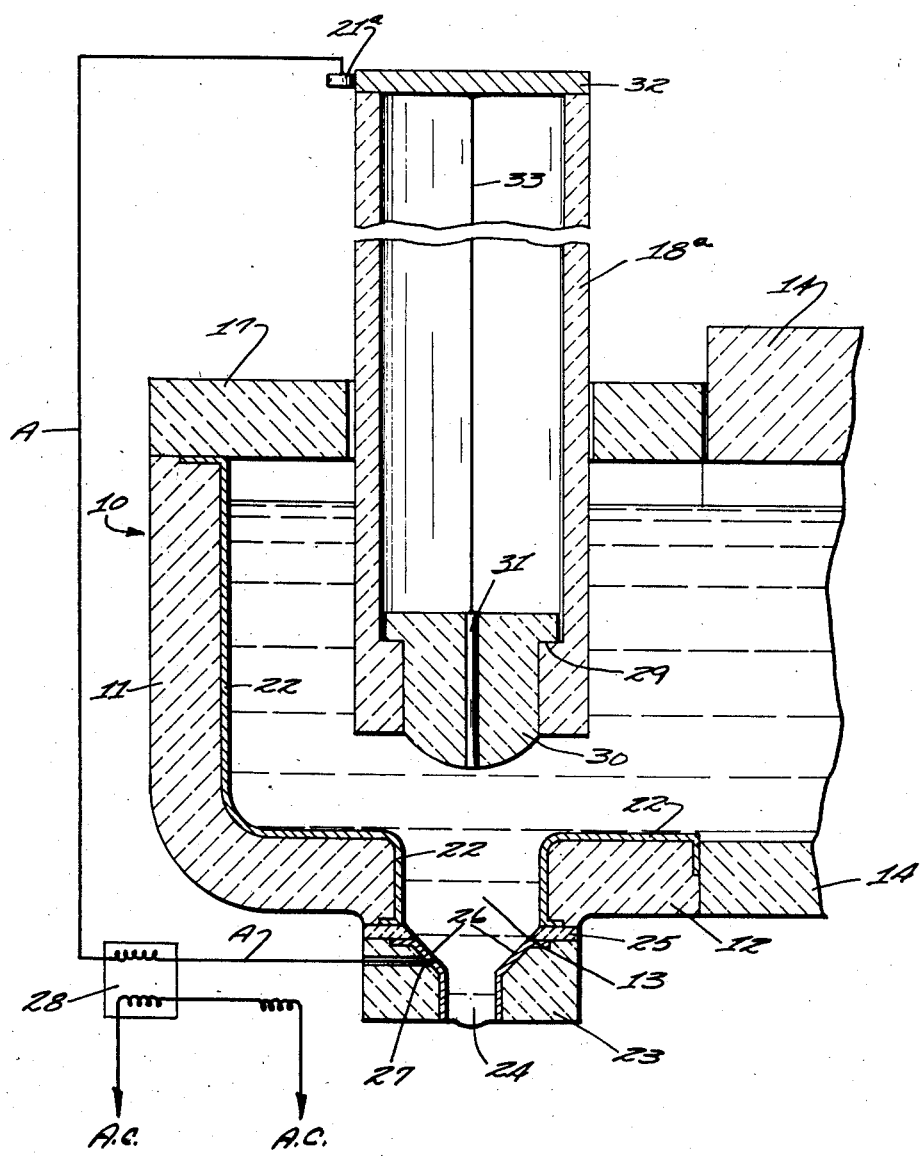
Fig. 2 is a sectional elevational view, showing the second embodiment of the invention.

Referring to Fig. 2, the second embodiment of the invention will now be described. In this embodiment, the upper electrode comprises a rotating sleeve comprising a hollow main body 18a, similar in operation to that described under the first embodiment, but with the addition of an annular lower bearing surface 29 integral with the lower end of sleeve 18a. A plug member 30, constructed of refractory or other insulator material, is carried concentrically within sleeve 18a and is supported by bearing surface 29. A conductor electrode 31 is inserted centrally of plug member 30 and supported therein. The lower portion of sleeve 18a is submerged in the glass contained in bowl 10, so that electrode 31 is submerged at all times.

Mounted at the upper end of sleeve 18a, for rotation therewith, is an annular plate 32 made of any electricity-conducting material. An electrical conductor 33 is connected between plate 32 and the upper end of electrode 31. At the periphery of annular plate 32, a sliding electrical connection is provided by roller 21a engaging plate 32 to roll on its outer surface during rotation of sleeve 18a. Electrical circuit A is connected to roller 21a in a like manner, as was previously described in the first embodiment. Thus, by passing an electric current through circuit A, the glass contained in bowl 10 provides a resistance for transforming electrical energy flowing between electrode 31 and lower electrode 26 into heat at or near the discharge orifice. This heat conditions the glass for proper working characteristics just prior to feeding.

Various modifications may be resorted to within the spirit and scope of the appended claim.

I claim:

Apparatus for conditioning molten glass received from a glass furnace which comprises a bowl formed of an electricity-insulating material for containing said received glass and having integral bottom and side walls, a sleeve member inserted into said bowl, said member comprising a hollow main body formed of an electricity-insulating material, means for supporting said sleeve member such that the said main body is partially submerged in the glass in said bowl, said sleeve member being adaptable for rotation in said last-mentioned means, an annular plug member supported in the submerged portion of said main body, an electrode element supported by said annular plug member and axially disposed in said main body to be carried with said sleeve, an annular element of electricity-conducting material carried on the periphery of said main body remote from said submerged portion thereof, an electrical connection between said electrode member and said annular element, an electrical contactor in slideable engagement with said annular element and forming an electrical connection to said annular element, an orifice ring in the bottom wall of said bowl having a glass contacting surface defining a discharge outlet substantially aligned in underlying relationship with said sleeve member and adapted for continuously issuing a column of glass therethrough, the glass contacting surface of said orifice ring being formed of an electricity-conducting material, a source of electric current, and electrical connections, respectively, between said source and said glass contacting surface and said source and said contactor, said connections providing a circuit whereby electric current is impressed on the glass in the bowl intermediate said electrode element and said discharge outlet to provide Joule effect heating for controlling the temperature and viscosity of the glass issuing from said orifice.

References Cited in the file of this patent

UNITED STATES PATENTS

| | | |
|---|---|---|
| 1,718,608 | Soubier | June 25, 1929 |
| 2,031,083 | Weller | Feb. 18, 1936 |
| 2,179,224 | Soubier | Nov. 7, 1939 |
| 2,186,718 | Ferguson | Jan. 9, 1940 |
| 2,215,982 | Slayter et al. | Sept. 24, 1940 |
| 2,276,295 | Ferguson | Mar. 17, 1942 |
| 2,283,800 | Ferguson | May 19, 1942 |
| 2,688,469 | Hohmann | Sept. 7, 1954 |
| 2,765,586 | Wilson | Oct. 9, 1956 |